May 21, 1957

HANS-JOACHIM M. FÖRSTER
CHANGE-SPEED GEAR AND METHOD OF
SHIFTING THEREFOR 2,792,714

Filed June 28, 1951

Inventor
Hans-Joachim M. Förster
By Austin, Micke, Wilhelm & Padlon
Attorneys

Inventor
Hans-Joachim M. Förster
By Austin, Hicke, Wilhelm & Padlon
Attorneys

United States Patent Office 2,792,714
Patented May 21, 1957

2,792,714

CHANGE-SPEED GEAR AND METHOD OF SHIFTING THEREFOR

Hans-Joachim M. Förster, Stuttgart-Bad Cannstatt, Germany, assignor to Daimler-Benz Aktiengesellschaft, Stuttgart-Unterturkheim, Germany Application June 28, 1951, Serial No. 234,075

Claims priority, application Germany June 28, 1950

33 Claims. (Cl. 74—368)

This invention relates to and has for its object to provide an improvement in change-speed gears, particularly of the kind having several transmission ratios or speeds adapted for use in motor vehicles by the use of one-way clutches or free-wheeling devices which can be engaged and disengaged.

Change-speed gears have been proposed heretofore wherein one of the speeds is provided with a main free-wheeling device or with a main one-way clutch, that is, with a one-way clutch transmitting the drive in one driving direction, normally in the main driving direction with the engine driving the vehicle, and wherein another speed is provided with a counter free-wheeling device or with a counter one-way clutch, that is, with a one-way clutch operative in the opposite driving direction, i. e., with the vehicle driving or pushing the engine. The main free-wheeling device is coordinated to a lower speed and the counter free-wheeling device to a higher speed and thereby prevents self-locking of the transmission under normal conditions.

The terms "main free-wheeling unit" or "main one-way clutch" have been selected only for the sake of clearness, it being understood that these terms are not to be taken as restricting the use and application of the present invention to a definite driving direction unless special reasons therefor are specifically given.

An important object of the present invention is a further development of such transmissions in that the principle of use of oppositely acting one-way clutches is extended to an entire transmission or to such parts thereof including several change gears or speeds whereby a novel and particularly advantageous mode of shifting is rendered possible.

Another object of the present invention is to provide a particularly useful method of gear shifting for change-speed gears provided with one-way clutches in several change gears or speeds thereof, particularly in such a manner that a complete disconnection of the driving connection in the transmission is obviated during shifting of gears.

Another object of the present invention is to provide a method of shifting which is shock-free in changing from one speed into another speed.

A further object of the present invention is to provide a method of shifting wherein, at any given time, only one clutch needs to be engaged at the same time without causing a disconnection of the drive, and wherein it is not necessary that the clutches, which are to be successively engaged, are tuned or matched with one another, i. e., the clutches, which are to be successively engaged, are constructed and adjusted in such a manner as to effect engagement of the next following clutch with respect to the time of disengagement of the preceding clutch as to prevent an interruption of the drive and to prevent simultaneous engagement of both clutches at any time.

A further object of the present invention is to provide such a transmission and such a method of shifting therefor that shock-free shifting into a higher speed can be accomplished without increase or decrease in engine speed.

To this end, a feature of the present invention resides in that, for purposes of causing the shifting into a higher gear ratio with the engine driving the vehicle, or into a lower gear ratio with the vehicle pushing or driving the engine, the load is taken from the one-way clutch, of the hitherto engaged speed, by the engagement of only one clutch. This load is then taken over by the one-way clutch of the new speed. For purposes of shifting into a lower gear ratio with the engine driving the vehicle, or into a higher gear ratio with the vehicle pushing or driving the engine, the load is taken over by the one-way clutch of the speed to be engaged with the parts to be coupled together operating at the same speed. This is accomplished by disengagement of only one clutch.

Moreover, according to the present invention, the shifting operation or method may be likewise performed in such a manner that within a range of an intermediate speed or gear ratio at any given time the one-way clutch of the one speed and the oppositely acting one-way clutch of the next speed are coupled with the associated shafts and are thereby brought into action so as to effect the drive from the engine through the lower gear ratio and the drive in the opposite direction, i. e., from the driven side to the engine, through the higher gear ratio.

According to another feature of the present invention, four clutches are always in engagement at any given time in an intermediate gear or transmission ratio, namely, for the main driving direction, clutches of a lower and of a higher transmission ratio are in engagement, and for the opposite driving direction, clutches of an intermediate and of a higher transmission ratio are in engagement so that the intermediate transmission ratio remains the same with transmission of torque in both driving directions.

The present invention contemplates among other things, and this is a major feature, to perform a shifting operation from an intermediate transmission ratio or speed into one of two adjacent transmission ratios or speeds. The simultaneously engaged one-way clutch of the transmission ratio which is not to be engaged and the one-way clutch, which is operative in the opposite direction with respect thereto, of the hitherto engaged transmission ratio will be disengaged. Thereupon will occur the engagement, in addition to the one-way clutch already engaged, of the second one-way clutch of the transmission ratio to be engaged. Also, if necessary, the one-way clutch which is operative in the opposite direction with respect thereto and which is coordinated to the next transmission ratio will be engaged. Preferably, the disengagement of the previously engaged one-way clutches and the engagement of the one-way clutches to be presently engaged is accomplished successively so that in the resultant intermediate transmission ratio or change-gear stage the drive in the one driving direction takes place in the pre-existing transmission ratio or speed and in the other driving direction in the transmission ratio or speed to be presently engaged.

Further objects of the present invention are concerned with the special construction of the transmissions and one-way clutches, and more particularly with the use of main one-way clutches and counter one-way clutches in countershaft transmissions and in planetary transmissions, as well as with the construction of change-over clutches as one-way clutches effective in the one or in the other driving direction.

In order that the various objects, features, and advantages of the present invention may be more completely understood, five embodiments thereof, showing only a few of many constructions and combinations of parts to which the teaching of the instant invention may be applied, will now be described with reference to the accompanying diagrammatic drawings. In addition to these further objects, features and advantages of the present invention, the principle of operation of a transmission in accordance with the present invention as well as the shifting operation therefor will also become more obvious from the following description when taken in connection with the accompanying drawings which show, for purposes of illustration only, several preferred embodiments of the present invention, and wherein:

In the following description of the present invention, the condition when the drive or transmission of torque is in the direction from the engine to the vehicle wheels, i. e., with the engine driving the vehicle, is referred to for simplicity's sake as "driving engine," while the condition when the drive or transmission of torque is in the direction from the vehicle wheels to the engine, i. e., when the vehicle pushes or drives the engine, is referred to for simplicity's sake as "driving vehicle."

Figure 1:
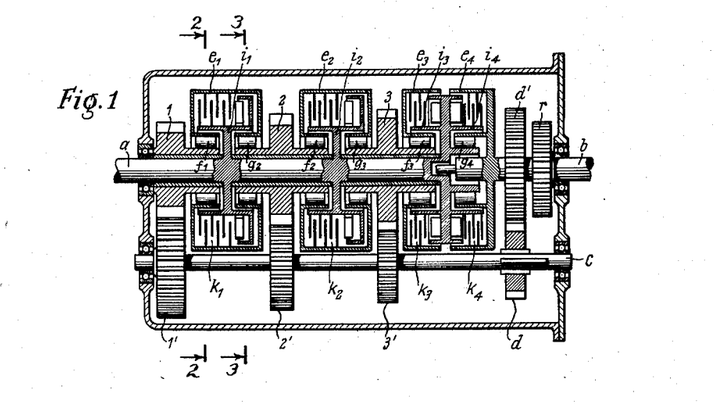
Figure 1 is a longitudinal cross sectional view through a four-speed countershaft transmission in accordance with the present invention with main one-way clutches and counter one-way clutches constructed to be effective as grip roller free-wheeling devices.

Referring now to the drawing, and more particularly to Figure 1, reference character $a$ represents the main drive shaft, $b$ the driven shaft and $c$ the countershaft. The main drive shaft $a$, for example, is driven from the engine, whereas the driven shaft $b$ drives an axle of the vehicle. The gear wheels 1, 2 and 3 for first, second and third speed, respectively, are rotatably mounted on the main or drive shaft $a$ and each of them meshes with a gear wheel 1', 2' and 3', respectively, mounted on the countershaft $c$ for common rotation therewith. Furthermore, countershaft $c$ and driven shaft $b$ are in permanent driving connection with one another by means of a pair of gears $d$ and $d'$ which are in constant meshing engagement with each other. The gear $r$, by way of example, serves for the reverse speed which may be engaged in any suitable manner, for example, by sliding the gear $d$ on countershaft $c$.

Referring again to Figure 1, main one-way clutches $f_1$, $f_2$ and $f_3$ effective as free-wheeling units and constituting the main free-wheeling units are arranged upon the hubs of the gear wheels 1, 2 and 3, respectively, and free-wheeling units $g_2$, $g_3$ and $g_4$ constituting counter free-wheeling units and serving as counter one-way clutches are arranged upon the hubs of the gear wheels 2 and 3, and upon a flange of the drive shaft $a$. The outer casings $e_1$, $e_2$, $e_3$ and $e_4$ of disk clutches $k_1$, $k_2$, $k_3$ and $k_4$ at the same time form outer casings or races for the main and counter free-wheeling units; each of the free-wheeling units $f_1$ and $g_2$ and likewise $f_2$ and $g_3$ cooperate with a common outer casing or race $e_1$ and $e_2$, respectively, whereas separate outer casings or races are associated with the main free-wheeling units $f_3$ and counter free-wheeling units $g_4$. The outer casing or race $e_4$ of the counter free-wheeling unit $g_4$ is rigidly mounted on the driven shaft $b$.

The inner clutch members $i_1$, $i_2$, $i_3$ and $i_4$ rotate together with the drive shaft $a$.

Figures 2, 3, 4:
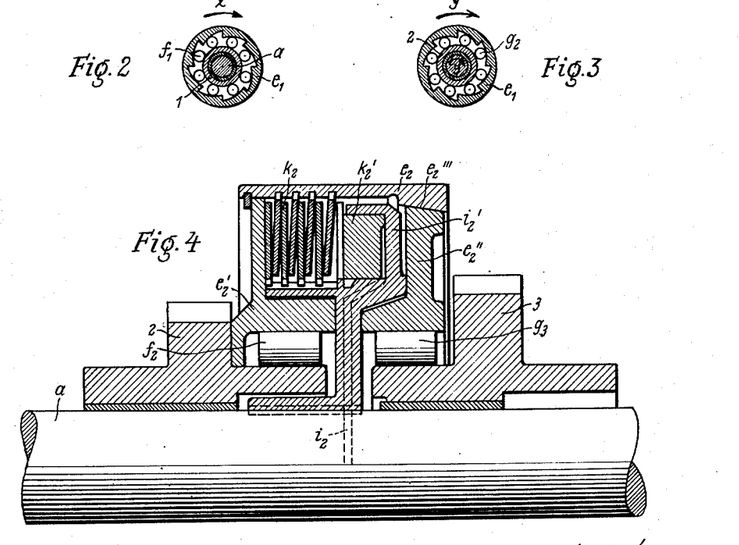
Figure 2 is a cross sectional view through a main free-wheeling unit taken along line 2—2 of Figure 1.
Figure 3 is a cross sectional view through a counter free-wheeling unit taken along the line 3—3 of Figure 1.
Figure 4 is a partial cross sectional view on a larger scale illustrating some structural details of the parts of the transmission illustrated in Figure 1.

As clearly shown in Figure 2 the main free-wheeling or one-way clutch units $f_1$, $f_2$ and $f_3$ are so constructed that during normal forward drive of the engine in the direction of the arrow $x$, the inner race of the free-wheeling unit, hence the corresponding gear wheel, for example, gear wheel 1 is coupled with the outer casing or race $e_1$ of the corresponding main free-wheeling unit $f_1$ by the grip exerted by the rollers, yet the grip of the main free-wheeling unit $f_1$ will be released when the gear wheel 1 or inner race, overtakes the outer casing or race $e_1$ in the direction $x$ as indicated by the arrow. Conversely, as clearly shown in Figure 3, a drive connection will be established through the counter free-wheeling or one-way clutch units $g_2$ and $g_3$ from the inner race to the outer casing or race, for example, to the outer casing or race $e_1$, i. e., from the driven member $b$ or from the gear wheels to the outer member of the coupling or to the driving member $a$, when the inner race overtakes the outer casing or race in the direction indicated by the arrow $y$ of Figure 3, that is when the drive takes place or comes from the vehicle in the normal forward direction of rotation. This applies in principle also to the counter free-wheeling unit $g_4$, except that in this case the outer casing or race $e_4$ is connected with the driven shaft $b$ and the inner race with the drive shaft $a$.

The clutches $k_1$, $k_2$, $k_3$ and $k_4$ are, for example, hydraulically shifted. A construction of such a clutch with the associated free-wheeling units is shown in Figure 4 in which, for example, the clutch $k_2$ is illustrated on an enlarged scale. The clutch member $i_2'$ is formed at the same time as a cylinder in which a piston $k_2'$ slides and engages the disk clutch $k_2$ by means of hydraulic pressure. As a result thereof, the outer casing $e_2$ is thereby coupled to the drive shaft $a$. Furthermore, the outer casing or clutch member $e_2$ is formed of several separate parts, if so desired, which, however, is not an imperative necessity for the shifting operation in accordance with the present invention, in such a manner that the outer casings or races $e_2'$ and $e_2''$ of the free-wheeling units $f_2$ and $g_3$ may slide towards one another in a cone $e_2'''$ when the piston $k_2'$ is not under pressure. A backward rolling of the vehicle with an engaged forward speed is thereby rendered possible which, however, can also be achieved by releasing the gear wheel $d$.

OPERATION

The principle of operation of the above described transmission of Figures 1 through 4 is as follows:

*First speed*

The clutch $k_1$ is engaged, while the remaining clutches are disengaged. As the power of the engine drives the drive shaft $a$ in the direction indicated in Figure 2 by the arrow $x$, the drive is transmitted through the free-wheeling unit $f_1$ and thence through gear wheels 1 and 1', countershaft $c$ and gear wheels $d$ and $d'$ to the driven shaft $b$. When the driving direction is reversed in that the drive is from the driven side, i. e., from the vehicle axle, then the main free-wheeling unit $f_1$ is released and the speed of the driven side or shaft $b$, as compared to the speed of the engine or shaft $a$, can increase until the counter free-wheeling unit $g_2$ is engaged and henceforth the transmission of the drive, with a "driving vehicle," is in a reverse direction from the driven shaft $b$ through the gear wheels $d$ and $d'$ and gear wheels 2 and 2', and, therefore, takes place in second speed.

*Second speed (inclusive shifting from first into second speed)*

In order to shift into second speed the clutch $k_2$ is engaged so that the races of the main free-wheeling or one-way clutch units $f_1$ and $f_2$ as well as those of the counter free-wheeling or one-way clutch units $g_2$ and $g_3$ are operatively connected with the driving and driven side. With a "driving engine," the transmission of the drive in second speed is taken over at once and in a shock-free manner at the instant of the shifting when the clutch $k_2$ is engaged, by the main free-wheeling unit $f_2$ through the gear wheels 2 and 2', the main free-wheeling unit $f_1$ being released by acceleration of the gear wheel 1 through the countershaft $c$. On the other hand, with a "driving vehicle" the transmission of the drive is maintained by the counter free-wheeling unit $g_2$, consequently is maintained in second speed, since the inner race of the counter free-wheeling unit $g_3$ revolves at a lower rate of speed due to its operative connection with meshing gear wheels 3 and 3' than the outer casing or race $e_2$ of this counter free-wheeling unit $g_3$. Since the main free-wheeling unit $f_2$ as well as the counter free-wheeling unit $g_2$ transmit the drive in the one as well as in the other direction, the gear wheel 2 is rigidly coupled with the drive shaft $a$ so that second speed is engaged in both driving directions.

*Third speed (inclusive shifting from second into third speed)*

Shifting into third speed is accomplished by disengaging the clutch $k_1$ and thereupon engaging the clutch $k_3$. Upon disengagement of the clutch $k_1$, with a "driving vehicle," the counter free-wheeling unit $g_2$ is already effectively disconnected from the drive transmission in the intermediate change-gear stage, i. e., with clutch $k_1$ disengaged but with clutch $k_3$ not yet engaged, in that its function in third speed is taken over by the counter free-wheeling unit $g_3$ as soon as synchronism in speed exists between the parts to be operatively connected thereby. On the other hand, with a "driving engine," the drive transmission through the free-wheeling unit $f_2$ in second speed is at first maintained. The change in speed from second into third gear with a "driving engine" takes place only after engagement of the clutch $k_3$ in that the drive is then taken over at once in a shock-free manner by the main free-wheeling unit $f_3$ in the place of the main free-wheeling unit $f_2$.

*Fourth speed (inclusive shifting from third into fourth speed)*

In order to shift into fourth speed the clutch $k_2$ is at first disengaged or thrown out. The drive or transmission of power with a "driving vehicle" is already established in the intermediate change-gear stage with only clutch $k_2$ disengaged in the corresponding manner described hereinabove through the counter free-wheeling unit $g_4$ instead of through the counter free-wheeling unit $g_3$ so as to provide a direct drive connection between driven shaft $b$ and drive shaft $a$, i. e., a direct drive connection in the fourth speed. On the other hand, with a "driving engine," the drive transmission through the free-wheeling unit $f_3$ is at first maintained until the clutch $k_4$ is engaged or thrown in. The clutch $k_4$ connects the inner clutch part $i_4$, which is rigidly connected with the drive shaft $a$, directly to the clutch part $e_4$ arranged upon the driven shaft $b$, and thereby establishes a direct positively engaged drive connection in both directions while by-passing the free-wheeling units.

Shifting from a higher into a lower gear takes place, in principle, in the same manner except only with a reverse sequence of the mode of engagement and disengagement of the corresponding transmission parts.

Thus it will be seen that for effecting a shift from one speed into another speed and also between intermediate change-gear shifting stages it is only necessary in either driving direction and in each case, to operate or shift only one clutch at the same time. For example, on shifting from second into third speed, and respectively from third into fourth speed, only one clutch is thrown out or disengaged at first thereby establishing an intermediate change-gear shifting stage and only thereupon another clutch is engaged.

Accordingly, three clutch units participate in the shifting operation at any given time. With an engaged intermediate speed, i. e., neither the highest nor the lowest speed, two clutch units are engaged whereby, on the one hand, the main free-wheeling unit of a lower speed and the counter free-wheeling unit of this intermediate speed and, on the other hand, the main free-wheeling unit of this intermediate speed and the counter free-wheeling unit of the higher speed are held in readiness for the drive transmission. The drive, with a "driving engine," is thereby taken over by the highest engaged main free-wheeling unit, i. e., by the main free-wheeling unit of the intermediate speed, while the drive, with a "driving vehicle," is taken over by the lowest engaged counter free-wheeling unit, i. e., also by the counter free-wheeling unit of the intermediate speed, so that in both driving directions, the drive is effected in the intermediate speed. When shifting into another speed, the clutch unit associated with a speed most remote to the new desired speed to be engaged is initially disengaged whereby at first a change of speed or gear takes place only in one driving direction due to the fact that the drive is taken over at that time by the already engaged counter free-wheeling unit of the new speed to be engaged when shifting up, or, when shifting down, by the main free-wheeling unit of the new speed to be engaged. Only thereupon will the next-following clutch unit associated with the new speed or gear be engaged, whereby the change in speed or gear also takes place in the other driving direction.

In principle, the lowest main free-wheeling unit, hence main free-wheeling unit $f_1$ for the described transmission, need not be releasable or disengageable but instead may be held permanently in readiness. The same applies also, in a like manner, to the highest counter free-wheeling unit $g_4$. However, if it is desired that both first and fourth speeds may be engaged in both driving directions, then it is necessary to provide a clutch corresponding to clutch $k_4$ for the purpose of locking the free-wheeling unit.

The embodiment of the present invention according to Figure 5 illustrates again a four-speed transmission provided with drive shaft $a$, driven shaft $b$, countershaft $c$, constant transmission ratio obtained by meshing gears $d$ and $d'$, and gear wheels 1 and 1' for first speed, gear wheels 2 and 2' for second speed and gear wheels 3 and 3' for third speed.

Figure 5:
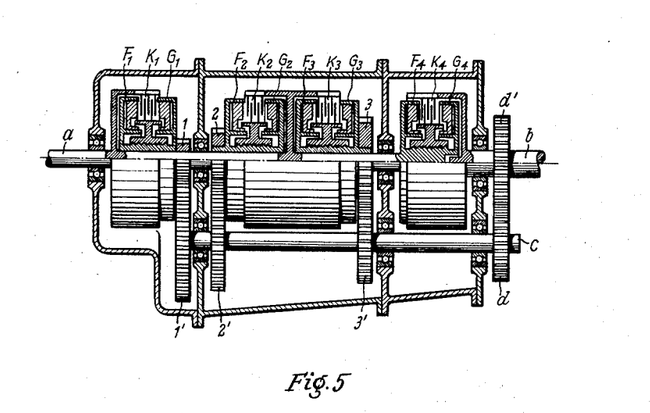
Figure 5 is a longitudinal cross sectional view of a four-speed transmission the individual speeds of which may be engaged by means of one corresponding shifting clutch, each shifting clutch being adapted to be engageable as main and counter free-wheeling devices.
Figure 6:
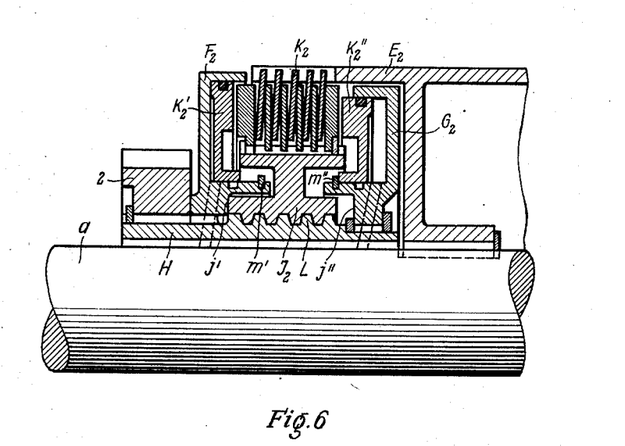
Figure 6 is a partial cross sectional view on a larger scale of a single shifting clutch according to Figure 5.

In contrast to the embodiment according to Figure 1, each of the gear wheels 1, 2 and 3 may be coupled with the drive shaft $a$ by means of change-over clutches $K_1$, $K_2$, $K_3$; furthermore, a clutch $K_4$ is provided for coupling the drive shaft $a$ directly to the driven shaft $b$. One of these clutches, such as clutch $K_2$, is illustrated in Figure 6 on an enlarged scale. The clutch, for example, clutch $K_2$, is again formed as a disk clutch with the outer clutch part $E_2$ thereof rigidly mounted on the shaft $a$. The inner clutch part $J_2$, by means of thread $L$, is in threaded engagement with a muff $H$ which is arranged rotatably but axially non-slidably on the shaft $a$, and is rigidly connected to the gear wheel 2. Furthermore, the cylinders $F_2$ and $G_2$ accommodating therein the slidable pistons $K_2'$ and $K_2''$, respectively, are also rigidly connected to the gear wheel 2 and muff $H$, respectively.

OPERATION

The principle of operation of this clutch will now be described:

When the shaft $a$, with a "driving engine," does the driving, then the inner clutch part $J_2$, due to the residual friction in the clutch disks $K_2$ and depending on the direction of the lead of the thread $L$, seeks to displace itself towards one side, for example, towards the left until it abuts against the stop $j'$. However, a transmission of the drive can take place in that case only after fluid in cylinder $F_2$ has been put under pressure so that piston $K_2'$ compresses the gang of friction disks $K_2$ of the clutch and therewith clutches together the parts $J_2$ and $E_2$. Thus, the gear wheel 2 is coupled with the drive shaft $a$ in the main driving direction, i. e., with an engaged forward speed and with a "driving engine."

When the driving direction is reversed in that the engine is overtaken by the driven side, then the clutch $K_2$ disengages itself from the piston $K_2'$ which is retained by a stop $m'$, whereby the clutch part $J_2$ is thereupon guided by thread $L$ in the opposite direction until it abuts against the stop $j''$. However, the transmission of drive or torque in the counter-direction can take place only after fluid in the cylinder $G_2$ has been put under pressure whereby the piston $K_2''$ is forced against the gang of friction disks $K_2$. If, in that case, the drive is taken over again by the engine and the gang of friction disks $K_2$ is again moved towards the left, then piston $K_2''$ can follow the gang of disks $K_2$ only up to a stop $m''$, whereupon the clutch $K_2$ will be released from the piston $K_2''$.

Thus by putting the pistons $F_2$ and $G_2$ alternately under pressure the clutch $K_2$ can selectively be effective as main free-wheeling unit or counter free-wheeling unit. If a coupling in both driving directions is to be effected, both pistons $F_2$ and $G_2$ will then be put under pressure. If both cylinders are without engaging pressure the clutch will idle. The remaining clutches illustrated in Figure 5 are operable in a corresponding manner in that the clutch cylinders $F_1$ through $F_4$ are used as main free-wheeling units and the clutch cylinders $G_1$ through $G_4$ are used as counter free-wheeling units.

A particularly advantageous principle of shifting will be obtained when, in the construction of the present invention according to Figure 5, the clutch cylinders on the left, for example clutch cylinder $F_2$ are simultaneously put under pressure, for example, by common delivery ducts, together with the right-hand clutch cylinders of the next higher adjacent clutch, for example, with clutch cylinder $G_3$, so that the one clutch will act as a main free-wheeling unit and the other clutch as a counter free-wheeling unit. It is thereby rendered possible for the principle of shifting described in connection with the embodiment of the invention according to Figure 1 to be also realizable with the embodiment of the invention according to Figure 5 by appropriate progressive step-wise shifting. However, any suitable principle of shifting may also be employed.

The embodiment of the invention according to Figure 5, as compared to the embodiment of Figure 1, has the advantage that the positions of the various speeds or gears may be selected at will since a definite sequence in the engagement of the free-wheeling units and counter free-wheeling units need not be observed.

The application of the present invention to planetary transmissions is shown diagrammatically in Figures 7-18 illustrating three further embodiments in accordance with the present invention. Reference character $a$ designates thereby at all times the drive shaft, and reference character $b$ the driven shaft. The main free-wheeling or one-way clutch units again are designated by reference characters $f_1$, $f_2$, $f_3$, and the counter free-wheeling or one-way clutch units by reference characters $g_2$, $g_3$, $g_4$. Clutches provided for the shifting of the transmission are represented by reference characters $q_1$, $q_2$, $q_3$, and brakes for the same purpose by reference characters $p_1$, $p_2$, and $p_3$ which couple revolving parts of the transmission with relatively stationary parts thereof, for example, with the housing, while in addition thereto performing the function of shifting clutches.

Figure 7:
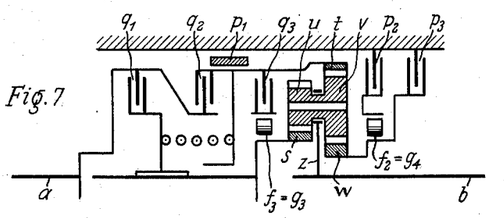
Figure 7 is a diagrammatic view of a planetary four-speed transmission with an arrangement for changing gears between second, third and fourth speed in accordance with the present invention.
Figure 8:
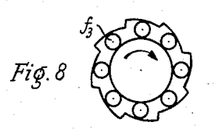
Figures 8 and 9 are diagrammatic views of the free-wheeling devices used in the embodiment of Figure 7 as seen from the driving side thereof.
Figure 9:
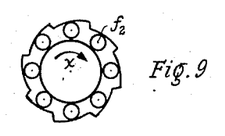

In the construction of the present invention according to Figures 7 to 9 provision is made for a double-planetary gear transmission provided with the planet gears $u$ and $v$. The planet gears $u$ are in mesh with the sun gear $s$ which is adapted to be coupled with the drive shaft $a$ through the clutch $q_1$. The planet gears $v$, on the one hand, are in mesh with the outer or ring gear $t$, which may be coupled to the drive shaft $a$ by clutch $q_2$ or may be coupled with sun gear $s$ through clutch $q_3$ and free-wheeling unit $f_3$ or which may be held stationary by the brake $p_1$. On the other hand, planet gears $v$ are in mesh with the sun gear $w$ which can be held stationary either by means of the brake $p_3$ in both directions or by means of the brake $p_2$ through the free-wheeling unit $f_2=g_4$ in only one driving direction. The planet carrier $z$ is rigidly connected to the driven shaft $b$.

OPERATION

The principle of operation of the transmission of Figures 7 to 9 is the following:

First speed

Clutch $q_1$ and brake $p_1$ both are engaged so that, in both driving directions, the drive is transmitted in the same speed or gear. The drive takes place from drive shaft $a$ through clutch $q_1$ to sun gear $s$. The driven side $b$ which is connected to the planet carrier is geared down with brake $p_1$ engaged. Clutch $q_1$ and brake $p_1$ may be urged into engagement by means of suitable springs or may be engaged by means of pressurized oil. If the drive takes place in the direction $x$, then brake $p_2$ will also be placed under oil pressure in any suitable manner. However, since the sun gear $w$ in first speed is driven in the forward direction, free-wheeling unit $f_2$ is disengaged.

On changing the driving direction from a "driving engine" to a "driving vehicle," no change takes place either in the operation of the transmission or in its transmission ratio.

Second speed

Shifting into second speed is accomplished by the disengagement of clutch $q_1$ and brake $p_1$ and by the engagement of clutches $q_2$ and $q_3$ and of brake $p_3$, while brake $p_2$ remains engaged. Brake $p_2$ is not needed for the transmission of power in first and second speed but only in the intermediate stage from second to third speed. Clutch $q_3$ is engaged after engagement of the clutch $q_1$ and of brake $p_3$; as a result thereof the free-wheeling unit $f_3$ is effective as counter free-wheeling unit $g_3$ in the intermediate stage from second to third speed and as main free-wheeling unit $f_3$ in the intermediate stage from third to fourth speed. Ring gear $t$ is connected to the drive shaft $a$ through clutch $q_2$, whereas sun gear $w$ is held stationary by brake $p_3$. Sun gear $s$ idles in both driving directions since the outer race of free-wheeling unit $f_3$, connected to ring gear $t$ through clutch $q_3$, revolves at a greater speed than sun gear $s$. The drive conditions are the same when the drive is from the vehicle instead of from the engine. Likewise, in second speed a gearing down still takes place through less than in first speed.

Intermediate stage

Brake $p_3$ is thrown out or disengaged as a first step in changing into third speed, so that sun gear $w$ is prevented from rotating in a backward or reverse direction only by brake $p_2$ and free-wheeling unit $f_2$.

If the drive is from a "driving engine," hence from ring gear $t$, while the resistance of the driven side is effective at planet carrier $z$, then sun gears $s$ and $w$ will tend to revolve in a direction opposite to that of planet carrier $z$. Counter free-wheeling unit $g_3$ releases this movement, whereas sun gear $w$ is blocked by free-wheeling unit $f_2$ so that, with a "driving engine," the second-speed gear ratio is maintained.

If the drive is from the driven side, hence with a "driving vehicle," where accordingly the drive comes from planet carrier and the drive resistance occurs at ring gear $t$, then sun gears $s$ and $w$ will tend to overtake the outer wheel or ring gear $t$. Counter free-wheeling unit $g_3$ is thereby locked and as a result thereof, sun gear $s$ is likewise coupled with the drive shaft $a$. Consequently, sun gear $s$ and ring gear $t$ rotate together with the entire planetary gear as a unit. Consequently, the shafts $a$ and $b$ are coupled together directly in third speed.

Third speed

For the purpose of effecting ultimate engagement of the third speed, clutch $q_1$ is thrown in or engaged thereby providing a direct third-speed engagement in main driving direction with a "driving engine" as well as in the opposite driving direction with a "driving vehicle."

Intermediate stage

As a first step in shifting to fourth speed clutch $q_2$ is thrown out or disengaged while clutches $q_1$ and $q_3$ and brake $p_2$ remain in engagement. By means of the disengagement of clutch $q_2$ the ring gear $t$ is disconnected from the drive; however, a drive connection is retained by clutch $q_3$ in one driving direction from ring gear $t$ to drive shaft $a$ through free-wheeling unit $f_3$.

With a "driving engine" driving through sun gear $s$, and, therefore, with the resistance of the driven side occurring at the planet carrier $z$, the ring gear $t$ will tend to revolve oppositely with respect to sun gear $s$ thereby causing the free-wheeling unit $f_3$ to grip. Consequently, third speed will be maintained with a "driving engine."

When the drive is from the opposite direction, i. e., with a "driving vehicle," the resistance is effective on the sun gear $s$. The ring gear $t$ is then moved in the forward direction so that it overtakes the sun gear $s$, whereas sun gear $w$ is urged in a reverse direction of rotation. While free-wheeling unit $f_3$ releases the drive from ring gear $t$ the free-wheeling unit $f_2$ is locked and, consequently, is effective as counter free-wheeling unit $g_4$. Thus, sun gear $w$ is held stationary which corresponds to the engagement of fourth speed with a "driving vehicle."

Fourth speed

For the purpose of engaging the fourth speed in both driving directions, brake $p_3$ is engaged so that altogether clutches $q_1$ and $q_3$ and brakes $p_2$ and $p_3$ are then engaged. The engagement of brake $p_3$ has the effect of holding sun gear $w$ stationary in both directions of rotation, whereas sun gear $s$ provides the driving input and planet carrier $z$ the driven output while ring gear $t$ idles. Fourth speed or overdrive is thereby engaged.

In the embodiment of the invention according to Figures 10 to 14 altogether three free-wheeling or one-way clutch units $f_1$, $f_2$, and $f_3$ and three counter free-wheeling or one-way clutch units $g_2$, $g_3$ and $g_4$ are provided so as to enable realization of the shifting method in accordance with the present invention for all speeds or gears. Free-wheeling unit $f_2$ and counter free-wheeling unit $g_4$ as well as free-wheeling unit $f_3$ and counter free-wheeling unit $g_3$, in that case, are also united into one free-wheeling device each. Eventually free-wheeling unit $f_1$ may be dispensed with in that the free-wheeling effect of the band brake $p_1$ may be used for the purpose of realization of the principle.

OPERATION

The mode of action is in principle the same as that of the embodiment described hereinbefore.

First speed

Figure 10:
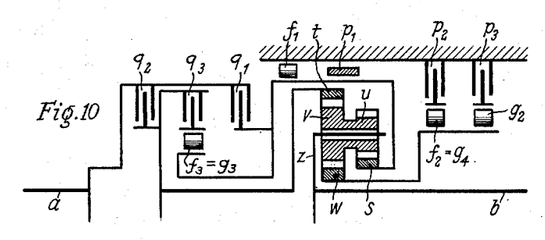
Figure 10 is a diagrammatic view of a further planetary transmission for shifting gears between all the speeds of the transmission in accordance with the present invention.
Figure 11:
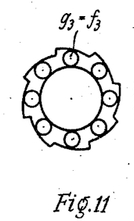
Figures 11 to 14 are diagrammatic views of the free-wheeling devices used in the embodiment of Figure 10 as seen from the driving side thereof.
Figure 12:
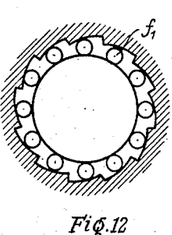
Figure 13:
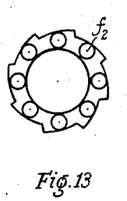
Figure 14:
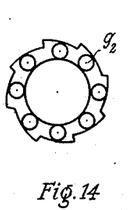

In first speed, clutches $q_2$ and $q_3$ and brakes $p_1$ and $p_3$ are engaged. As a result thereof, ring gear $t$ constitutes the transmission input while sun gear $s$ is held stationary. A gearing down takes place which is also maintained with a "driving vehicle." Sun gear $w$ thereby idles along in a reverse direction of rotation.

Second speed

If, as a first step to shifting into second gear, brake $p_1$ is disengaged, free-wheeling unit $f_1$ will then be locked against the housing if the drive is from the engine through ring gear $t$, i. e., with a "driving engine" since sun gear $s$ attempts to rotate in the reverse direction of rotation. Consequently, the first speed will be maintained. When the drive is reversed, i. e., with a "driving vehicle," sun gears $s$ and $w$, to the contrary, owing to the resistance at ring gear $t$ tend to revolve in a forward direction of rotation thereby causing sun gear $w$ to be locked by counter free-wheeling unit $g_2$. The drive then takes place in second speed. For the purpose of effecting ultimate engagement of second speed, brake $p_2$ is also engaged whereby free-wheeling unit $f_2$ and counter free-wheeling unit $g_2$ retain sun gear $w$ in both directions of rotation.

Third speed

For the purpose of shifting into third speed, brake $p_3$ is initially disengaged and thereupon clutch $q_3$ is engaged. Disengagement of brake $p_3$ has the effect that with a "driving engine," i. e., with a driving ring gear $t$, the sun gears $s$ and $w$ tend to revolve in a reverse direction whereby free-wheeling unit $f_2$ will lock and second speed will be maintained thereby. Concurrently therewith, sun gear $s$ is released in the forward direction of rotation from free-wheeling unit $f_2$. On the other hand, with a "driving vehicle," both sun gears $s$ and $w$, owing to the resistance at ring gear $t$, are driven in the forward direction of rotation which is permitted by free-wheeling units $f_2$ and $f_1$. On the other hand, counter free-wheeling unit $g_3$ locks since the inner race of counter free-wheeling unit $g_3$, which is connected to sun gear $s$ tends to overtake the driven outer casing or race of the counter free-wheeling unit $g_3$ which is connected to the drive shaft $a$ by clutch $q_3$. Thus, with a "driving vehicle" counter free-wheeling unit $g_3$ couples sun gear $s$ to ring gear $t$ whereby the entire transmission revolves as one single unit and thereby establishes a direct drive.

In order to bring about ultimate engagement of third speed or direct dirve, clutch $q_1$ is engaged so that clutch $q_1$ performs the function of counter free-wheeling unit $g_3$ in both directions of rotation. Clutches $q_2$ and $q_3$ and brake $p_2$ continue to be engaged.

Fourth Speed

When shifting into fourth speed, clutch $q_2$ is initially disengaged so that ring gear $t$ remains drivingly connected only in one driving direction with the drive shaft $a$ through clutch $q_1$ and free-wheeling unit $f_3=g_3$. As in third speed clutch $q_1$ and brake $p_2$ remain engaged. With a "driving engine," i. e., when sun gear $s$ is the driving input, then, due to the resistance at planet carrier $z$, the ring gear $t$ tends to revolve backwards. This causes gripping of free-wheeling unit $f_3$ whereby third speed is kept engaged. With a "driving vehicle," i. e., with the driving input at planet carrier $z$ and with resistance at sun gear $s$, ring gear $t$ tends to revolve in a forward direction and sun gear $w$ in a reverse direction of rotation, whereby ring gear $t$ is released whereas sun gear $w$ is locked in the free-wheeling unit $f_2$ which is effective thereupon as counter free-wheeling unit $g_4$.

For the purposes of causing ultimate engagement of the fourth speed, the brake $p_3$ is applied which supplements thereby the function of brake $p_2$ in the counter direction and thereby holds stationary sun gear $w$ in both directions of rotation. Thus, fourth speed or overdrive is engaged.

Consequently, in the embodiment of the present invention according to Figure 10, with every shift from one speed to another one clutch or brake initially is disengaged, and only thereupon the next clutch or brake is engaged. More particularly, from first to second speed, brake $p_1$ is initially disengaged and thereupon brake $p_2$ is engaged, in changing from second to third speed brake $p_3$ is initially disengaged and only thereupon clutch $q_1$ is engaged, in changing from third to fourth speed clutch $q_2$ is initially disengaged and only thereupon brake $p_3$ is engaged, while clutch $q_3$ is always engaged in a forward direction of rotation. In the intermediate stages resulting therefrom, the drive is transmitted with a "driving engine" by means of a main free-wheeling unit in the presently existing speed or gear whereas, with a "driving vehicle," the drive is transmitted by means of a counter free-wheeling unit in the next speed or gear. Therefore, in the intermediate stage between first and second speed, the drive transmission takes place by locking the main free-wheeling unit $f_1$ with a "driving engine" and by locking the counter free-wheeling unit $g_2$ with a "driving vehicle," in the intermediate stage between second and third speed, by locking the free-wheeling unit $f_2$ or counter free-wheeling unit $g_3$, and in the intermediate stage between third and fourth speed, by locking the free-wheeling unit $f_3$ or counter free-wheeling unit $g_4$.

In the transmission according to the present invention illustrated in Figures 15 to 18 all functionally similar parts are again designated by the same reference characters as in the above-described embodiments. This transmission differs from that shown in Figure 10 in that in this case two planetary gears are connected together cross-wise in such a manner that the sun gear $s_1$ of the first planetary gear is connected with the outer or ring gear $s_2$ of the second planetary gear, and further that the outer or ring gear $w_1$ of the first planetary gear is connected with the sun gear $w_2$ of the second planeary gear. Reference characters $u_1$ and $v_1$ designate double planet gears of the first planetary gear which are connected with one another, while reference character $u_2$ designates planet gears of the second planetary gear. The planet carriers of both planetary gears are designated by reference characters $z_1$ and $z_2$, respectively, of which planet carrier $z_2$ is connected again with the driven side $b$.

*First speed*

Figure 15:
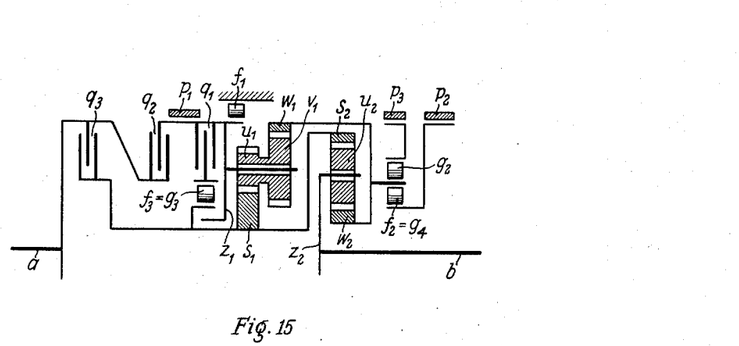
Figure 15 is still another diagrammatic view of a planetary gear transmission in accordance with the present invention having two planetary gears connected crosswise.
Figure 16:
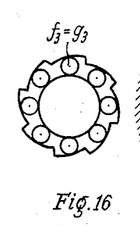
Figures 16 to 18 are diagrammatic views of the free-wheeling devices used in the embodiment of Figure 15 as seen from the driving side thereof.
Figure 17:
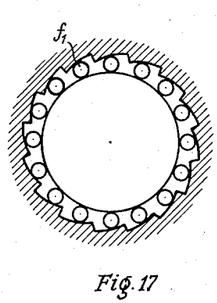
Figure 18:
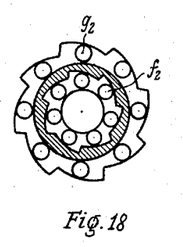

In the first speed, clutches $q_1$ and $q_3$ and brakes $p_1$ and $p_3$ are engaged; planet carrier $z_1$ is, therefore, held fast. Sun gear $s_1$ and ring gear $s_2$ are driving, whereas sun gear $w_2$ and ring gear $w_1$ revolve in a reverse direction of rotation as permitted by counter free-wheeling unit $g_2$. The speed of driven shaft $b$ is then less than that of drive shaft $a$.

*Second speed*

When shifting to second speed, brake $p_1$ is initially disengaged. In the intermediate stage, with a "driving engine," the locking against the housing is taken over by free-wheeling unit $f_2$ in the place of the brake $p_1$, whereas, with a "driving vehicle," i. e., with the driving input at planet carrier $z_2$ and with resistance at sun gear $s_1$ and ring gear $s_2$, the counter free-wheeling unit $g_2$ is locked since sun gear $w_2$ tries to revolve in the forward direction of rotation, whereby second speed is engaged. If ring gear $w_1$ stands still, planet carrier $z_1$ will revolve in a forward direction of rotation which is permitted by free-wheeling unit $f_1$ and by counter free-wheeling unit $g_3$.

In the second change-gear stage, brake $p_2$ is engaged. Clutches $q_1$ and $q_3$ and brake $p_3$ also are engaged. Counter free-wheeling unit $g_2$ and free-wheeling unit $f_2$ thereby supplement each other to form a stationary engaging device or brake by means of which sun gear $w_2$ and ring gear $w_1$ are held stationary. A gearing down from shaft $a$ to shaft $b$ results therefrom.

*Third speed*

When shifting into third speed, brake $p_3$ is initially disengaged while clutches $q_1$ and $q_3$ and brake $p_2$ remain engaged. In the intermediate stage, with a "driving engine," ring gear $w_1$ and sun gear $w_2$ attempt to revolve in the reverse direction of rotation with the resultant locking of the free-wheeling unit $f_2$ so that second speed is maintained. With a "driving vehicle," ring gear $w_1$ and sun gear $w_2$ and therewith also the planet carrier $z_1$ tend to overtake the central gears $s_1$ and $s_2$ which, though permitted by free-wheeling unit $f_1$, is nevertheless prevented by the counter free-wheeling unit $g_3$. Planet carrier $z_1$ is thereby coupled to sun gear $s_1$ and ring gear $s_2$ and thus the third speed or direct drive is engaged.

By the engagement of clutch $q_2$ during the second change-gear stage the drive is transmitted in both driving directions in third speed or direct drive. In this third speed clutches $q_1$, $q_2$ and $q_3$ and brake $p_2$ are engaged.

*Fourth speed*

In shifting to fourth speed, clutch $q_3$ is initially disengaged. In the intermediate stage resulting therefrom, with a "driving engine," the main free-wheeling unit $f_3$ which up to that time was effective as counter free-wheeling unit $g_3$, is locked since, due to the input drive at planet carrier $z_1$ and the resistance at planet carrier $z_2$, a division of the drive takes place through ring gear $w_1$ and sun gear $w_2$, on the one hand, and through sun gear $s_1$ and ring gear $s_2$, on the other hand, in such a manner that sun gear $s_1$ tends to revolve in a backward direction of rotation with resepct to shaft $a$. Consequently, with a "driving engine," the third speed is maintained. With a "driving vehicle," sun gear $w_2$ and ring gear $w_1$ tend to revolve in a reverse direction of rotation which, however, is prevented by free-wheeling unit $f_2 = g_4$. As a result thereof, sun gear, $s$, and ring gear $s_2$ overtake the planet carrier $z_1$ which is coupled to shaft $a$, and which is permitted by the free-wheeling units $f_3$ and $g_3$.

Upon engaging the second change-gear stage by means of applying the brake $p_3$, ring gear $w_1$ and sun gear $w_2$ are held fast in both driving directions by the free-wheeling units $f_2$ and $g_2$ effective in opposite direction so that the fourth speed or overdrive becomes effective in both driving directions.

Shifting down is performed in corresponding reverse manner. Most desirably, the reverse speed is arranged to the rear of the transmission.

As previously described, it will be apparent that in the embodiment of the present invention according to Figure 15, shifting from one speed into the next one is always accomplish in such a manner that a clutch or brake is initially disengaged whereby the presently existing speed is maintained in one driving direction, and more particularly in shifting up in the main driving direction and in shifting down in the opposite direction while the new speed will be effective only in the other driving direction, and that only thereupon the new speed or gear is ultimately engaged by the engagement of a further clutch.

Figure 19:
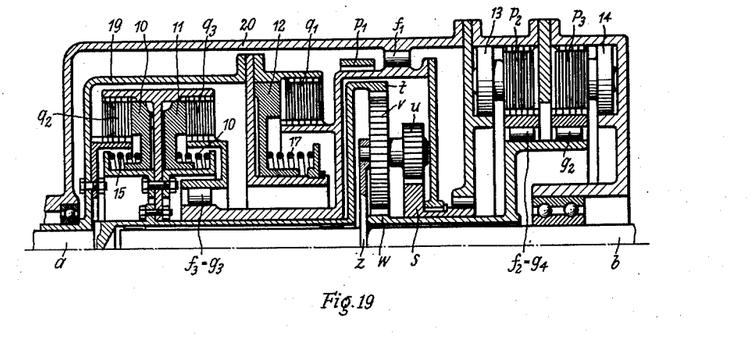
Figure 19 is a cross sectional view on a slightly larger scale illustrating the details of the transmission according to Figure 10.

Figure 19 shows a construction of the transmission in accordance with the diagrammatic view of Figure 10. Corresponding parts are designated therein with corresponding reference characters. In the embodiment according to Figure 19, the clutches are hydraulically actuated. For the purpose of actuating the clutches $q_2$, $q_3$ and $q_1$ and the brakes $p_2$ and $p_3$ pistons 10, 11, 12, 13, 14 are provided which are displaced by fluid pressure, and in connection with pistons 10, 11 and 12 against the tension of the springs 15, 16 and 17, resepctively. The fluid supply connections to the several piston spaces are not herein shown in detail, and may be constituted by means of oil lines which are formed by bores in the disk 18 and drum 19, respectively, or by means of separate lines or conduits which are connected thereto. Pistons 13 and 14 may be supplied with fluid pressure directly through the housing 20.

Figure 20:
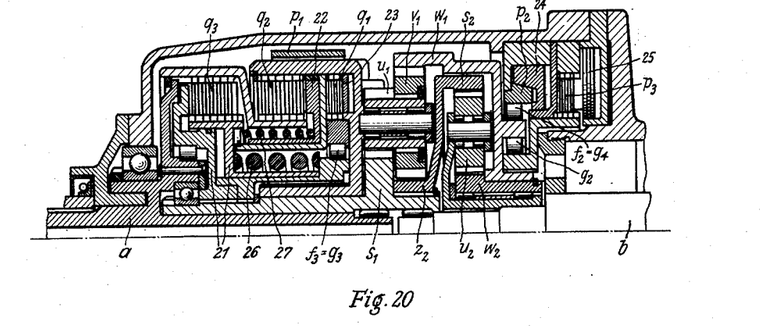
Figure 20 is a cross sectional view on a slightly enlarged scale illustrating the details of the transmission according to Figure 15.

The transmission of Figure 20 corresponds to that of Figure 15. Hydraulically operated pistons are provided for the purpose of actuating the clutches $q_3$, $q_2$ and $q_1$ and brakes $p_2$ and $p_3$. Pistons 21, 22, 23, 24 and 25 are supplied with fluid under pressure in the revolving parts or in the housing by means of supply lines, not shown herein in detail. Piston 21 is biased by a strong spring 26, and piston 22 is biased by spring 27. Piston 24 at the same time forms the outer clutch member of the cone clutch $p_2$ for the free-wheeling unit $f_2=g_4$.

The present invention is not limited or restricted to the specific method and embodiments illustrated and described herein but may be varied within the scope of the several inventive concepts as defined by the appended claims.

What is claimed is:

1. Change-speed gear comprising, a primary part, a secondary part, transmission members for obtaining a lower speed operatively connected between said primary and said secondary part, transmission members for obtaining a higher speed operatively connected between said primary and said secondary part, a main one-way clutch operatively connected with said lower speed transmission members, a counter one-way clutch operatively connected with said higher speed transmission members, and shifting means for simultaneously disabling the drive through said main one-way clutch and through said counter one-way clutch.

2. Change-speed gear comprising, a shaft, a transmission member freely supported upon said shaft, a second transmission member freely supported upon said shaft, a coupling member freely rotatable with respect to said shaft and to both of said transmission members, a one-way clutch connected between said first transmission member and said coupling member, a counter one-way clutch connected between said second transmission member and said coupling member, and means for coupling and de-coupling said coupling member to and from said shaft respectively.

3. Change-speed gear according to claim 2, wherein said transmission members are gear wheels, further comprising, a countershaft parallel to said shaft and further gear wheels upon said countershaft cooperating with said gear wheels for obtaining several transmission speeds.

4. Change-speed gear according to claim 2, wherein said coupling means comprises a hydraulically operated disk clutch.

5. Change-speed gear according to claim 2, wherein said two one-way clutches are arranged between said two transmission members, and said coupling member comprises the outer clutch elements and said transmission members the inner clutch elements of said one-way clutches, further comprising a coupling element connected to said shaft and arranged between said one-way clutches and within said coupling member, said coupling means being adapted to couple said coupling member to said coupling element.

6. Change-speed gear comprising a drive shaft, a driven shaft, transmission members for obtaining several speeds including a low speed, at least one intermediate speed, and a highest speed operatively connected between said drive shaft and said driven shaft, a main one-way clutch and a counter one-way clutch connected with the transmission members effecting said intermediate speed, a main one-way clutch connected with the transmission members effecting said low speed, a counter one-way clutch connected with the transmission members effecting said highest speed, coupling means for disconnecting the drive through said one-way clutches, said coupling means being operative to engage and disengage simultaneously the main one-way clutch of at least one of said speeds and the counter one-way clutch of the following higher speed.

7. Change-speed gear according to claim 6, wherein said low speed is engageable only through said main one-way clutch, and the counter one-way clutch of said highest speed and the main one-way clutch of said intermediate speed are separately engageable and releasable respectively, in combination with means for directly effecting said highest speed for both driving directions independently of said one-way clutches.

8. Change-speed gear comprising a primary part, a secondary part, gear means between said primary part and said secondary part including first transmission members for producing a lower-speed transmission and second transmission members for producing a higher speed transmission, a one-way clutch operatively connected with said first transmission members for transmitting a drive only from said primary to said secondary part, a further one-way clutch operatively connected with said second transmission members for transmitting a drive only from said primary to said secondary part, a counter one-way clutch operatively connected with said first transmission members for transmitting a drive only from said secondary to said primary part, a further counter one-way clutch operatively connected with said second transmission members for transmitting a drive only from said secondary to said primary part, means for disabling the drive through said first-mentioned counter one-way clutch, and means for disabling the drive through said further one-way clutch.

9. Change-speed gear according to claim 8 including means for simultaneously disabling the drive through said first-mentioned one-way clutch and through said further counter one-way clutch.

10. Change speed gear according to claim 8, wherein said one-way clutches and said counter one-way clutches are formed as grip roller free-wheeling devices.

11. Change-speed gear according to claim 8, wherein at least one of said one-way clutches and one of said counter one-way clutches each are united into a change-over clutch with means adapted for causing said change-over clutch to be effective either in one or the other driving direction.

12. Change-speed gear according to claim 8, wherein said transmission is formed as planetary transmission.

13. Change-speed gear with gear means for producing different transmission ratios including a first transmission member, a second transmission member and a third transmission member; a change-over clutch comprising, a first coupling member connected with said first transmission member, a second coupling member connected with said second transmission member, a third coupling member connected with said third transmission member, means for coupling said first with said third coupling member, means for coupling said second with said third coupling member, and means in each of said two coupling means for optionally rendering effective said coupling means either in the one or in the other direction of the drive either as main one-way clutch or as counter one-way clutch.

14. Change-speed gear according to claim 13 including, means for simultaneously actuating said two coupling means of said change-over clutch in such a manner that when one of said coupling means is effective as main one-way clutch, the other of said coupling means is effective as counter one-way clutch.

15. A change-speed gear comprising a first transmission member, a second transmission member, means optionally coupling said two transmission members to alternately provide thereby either a one-way clutch for transmitting the drive from said first to said second transmission member or a counter one-way clutch for transmitting the drive from said second to said first transmission member, said means including a coupling member automatically shifted in one or the other axial direction in dependence on the direction of the drive, and means for rendering said coupling member engageable with one or the other of said two transmission members upon shifting in one axial direction and in one relative direction of rotation and upon shifting in the other axial direction and in the other relative direction of rotation, said coupling means including means to provide a contact pressure in the one or the other axial direction.

16. Change-speed gear comprising a primary part, a secondary part, gear means between said parts including transmission members for obtaining a lower-speed transmission and transmission members for obtaining a higher-speed transmission, first means for alternately transmitting the drive in one of said speeds either in the direction from said primary to said secondary part and in the direction from said secondary part to said primary part or only from said secondary part to said primary part, second means for alternately transmitting the drive in the other one of said speeds either in the direction from said primary to said secondary part and in the direction from said secondary part to said primary part or only from said secondary to said primary part, and means for shifting said two last-mentioned means for initially engaging said first-named means for transmitting the drive in both directions, subsequently, during an intermediate stage, for engaging said first-named means for transmitting the drive only from said primary to said secondary part and for engaging said second-named means for transmitting the drive only from said secondary to said primary part, and for thereupon engaging said second-named means for transmitting the drive in both directions.

17. Change-speed gear according to claim 16, wherein said transmission is formed as planetary transmission.

18. Change-speed gear according to claim 16, wherein said transmission is formed as planetary transmission and said means comprise one-way clutches effective in one speed as main one-way clutch and in another speed as counter one-way clutch.

19. Change-speed gear comprising a relatively stationary part, a first shaft, a second shaft, a planetary gear train interposed between said two shafts, said planetary gear train having two sets of planet gears each connected with one another, four transmission members including a planet carrier and three gear wheels co-operating with said planet gears, means for connecting one of said four transmission members with said first shaft, means for connecting a second of said four transmission members with said first shaft, one-way engaging means operatively connected between said two last-mentioned transmission members, means for disabling the connection through said one-way engaging means, means for locking one of said two last-mentioned transmission members against said relatively stationary part, means for locking a third of said four transmission members against said relatively stationary part, one-way engaging means operatively connected between said last-mentioned transmission member and said relatively stationary part including means for disabling the connection through said last-mentioned one-way engaging means, and means for connecting the fourth of said transmission members to said second shaft.

20. Change-speed gear according to claim 19 wherein one of said first-mentioned two transmission members is a sun gear and the other one a planet gear, the third transmission member is a sun gear and the fourth transmission member the planet carrier, said two one-way engaging means being effective to provide a coupling in the opposite direction of rotation with respect to said two sun gears.

21. Change-speed gear according to claim 19 including third one-way engaging means in parallel with said first one-way engaging means between said second transmission member and said relatively stationary part, and a fourth one-way engaging means between said third transmission member and said second one-way engaging means.

22. Change-speed gear according to claim 19, wherein the one of said two first-mentioned transmission members is a sun gear, and the other one a planet gear, said third transmission member is a sun gear and said fourth transmission member the planet carrier, and said two one-way engaging means are so formed that they as to said two sun gears bring about a coupling in opposite direction of rotation, further comprising a third one-way engaging means in parallel with said first one-way engaging means and arranged between said second transmission member and said relatively stationary part, and a fourth one-way engaging means between said third transmission member and said second one-way engaging means, the first one of said two last-mentioned one-way engaging means being so formed as to said two sun gears that it causes a coupling in the same direction of rotation as the second one of said first-mentioned one-way engaging means, and the fourth of said one-way engaging means being so formed that it causes a coupling in opposite direction of rotation.

23. Planetary transmission comprising, a relatively stationary part, a driving transmission member, a driven transmission member, a third revolving transmission member, a one-way clutch between said third transmission member and said relatively stationary part, means between said one-way clutch and said relatively stationary part for optionally enabling and disabling the connection between said last-mentioned parts, an oppositely acting counter one-way clutch between said third transmission member and said relatively stationary part, and means between said counter one-way clutch and said relatively stationary part for optionally enabling and disabling the connection between said last-mentioned parts.

24. Change-speed gear comprising, a first shaft, a first planetary gear train with planet carrier, sun gear and planet gear, a second planetary gear train with planet carrier, sun gear and planet gear, a second shaft, means for connecting said first shaft with the planet carrier of said first planetary gear train, means for connecting the planet carrier of said second planetary gear train with said second shaft, means for connecting the sun gear of said first planetary gear train with the planet gear of said second planetary gear train, means for connecting the planet gear of said first with the sun gear of said second planetary gear train, a one-way clutch between the one of said two gears and the planet carrier of said first planetary gear train including means for disabling the coupling through said one-way clutch, means for coupling said last-mentioned gear of said first planetary gear train with said first shaft, a one-way clutch between the planet carrier of said first planetary gear train and said relatively stationary part, means for retarding said planet carrier, two oppositely acting one-way clutches in parallel with one another arranged with one of said gears each including means for enabling and disabling the connection between said two last-mentioned one-way clutches and said relatively stationary part.

25. Change-speed gear comprising a primary part, a secondary part, gear means intermediate said primary part and said secondary part including first transmission members for producing a lower-speed transmission, second transmission members for producing an intermediate-speed transmission and third transmission members for producing a higher-speed transmission, a first one-way clutch operatively connected with said first transmission members for transmitting a drive only from said primary to said secondary part in a first direction, a second one-way clutch operatively connected with said second transmission members for transmitting a drive only in said first direction, a first counter one-way clutch operatively connected with said second transmission members for transmitting a drive only from said secondary to said primary part in a second direction opposite to said first direction, a second counter one-way clutch operatively connected with said third transmission members to transmit a drive only in said second direction, first means for simultaneously disabling the drive through said first one-way clutch and said first counter one-way clutch, and second means for simultaneously disabling the drive through said second one-way clutch and through said second counter one-way clutch.

26. Change-speed gear according to claim 25 including further means for initially actuating said first means and for subsequently actuating said second means.

27. Change-speed gear comprising a drive shaft, a driven shaft, gear means between said shafts including transmission members for obtaining a lower-speed transmission and transmission members for obtaining a higher-speed transmission, a first counter one-way clutch and a first main one-way clutch operatively connected with said lower-speed transmission, a second counter one-way clutch and a second main one-way clutch operatively connected with said higher-speed transmission, first clutch means for disconnecting the drive through said first counter one-way clutch, second clutch means for simultaneously disconnecting the drive through said first main one-way clutch and through said second counter one-way clutch, and third clutch means for disconnecting the drive through said second counter one-way clutch.

28. Change-speed gear according to claim 27 including means operative upon engagement of both said first and second clutch means for initially engaging said third clutch means and thereupon disconnecting said first clutch means.

29. Change-speed gear with several gear means for producing several transmission ratios comprising one main one-way clutch in each gear means corresponding to transmission ratios lower than the highest ratio, and one counter one-way clutch in each gear means corresponding to transmission ratios higher than the lowest ratio.

30. Change-speed gear according to claim 29 including means for disabling the drive through said main one-way clutches in all gear means corresponding to transmission ratios higher than the lowest ratio, and means for disabling the drive through said counter one-way clutches in all gear means corresponding to transmission ratios lower than the highest ratio.

31. Change-speed gear including a plurality of gear means for producing a plurality of transmission ratios, each of said gear means corresponding to transmission ratios lower than the highest comprising a separate main one-way coupling, and each of said gear means corresponding to transmission ratios higher than the lowest comprising a separate counter one-way coupling.

32. Change-speed gear including a plurality of change-speed gearing means located adjacent each other to provide a plurality of transmission ratios, intermediate ones of said gearing means each including main one-way engaging means and counter one-way engaging means, one end gearing means including only one main one-way engaging means and the other end gearing means including only one of said counter one-way engaging means.

33. Change-speed gear comprising a primary part, a secondary part, gearing means between said parts, means operative with said gearing means for effecting a plurality of transmission ratios including means during shift into intermediate transmission ratios for retaining the same transmission ratio with the drive going through said gear means in one direction and selectively engageable clutch means for shifting to the next transmission ratio with the driving going through said gearing means in the opposite direction.

References Cited in the file of this patent

UNITED STATES PATENTS

| | | |
|---|---|---|
| 690,641 | Davis | Jan. 7, 1902 |
| 809,915 | Gabriel | Jan. 9, 1906 |
| 2,080,067 | Stucatur | May 11, 1937 |
| 2,153,856 | Weydell | Apr. 11, 1939 |
| 2,246,996 | Kreis | June 24, 1941 |
| 2,282,591 | Orr | May 12, 1942 |
| 2,288,631 | Linderman | July 7, 1942 |
| 2,298,645 | Jackes | Oct. 13, 1942 |
| 2,301,852 | Brown | Nov. 10, 1942 |
| 2,447,552 | Banker | Aug. 24, 1948 |
| 2,543,385 | Tarlton | Feb. 27, 1951 |
| 2,567,446 | Polomski | Sept. 11, 1951 |